Aug. 8, 1967   E. R. BERENDS ETAL   3,334,669
RADIAL ARM SAW

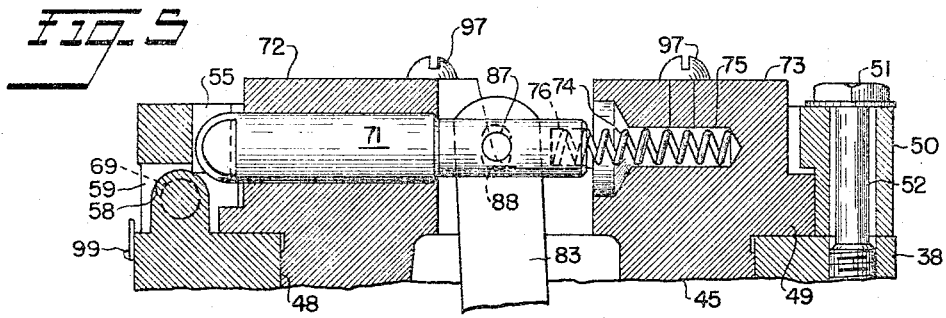
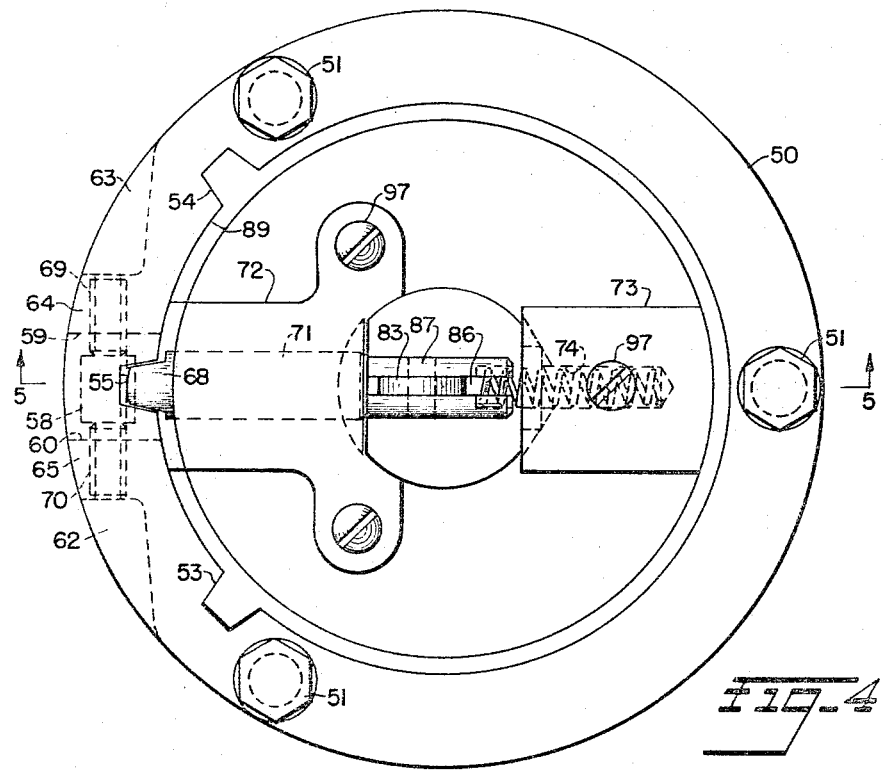
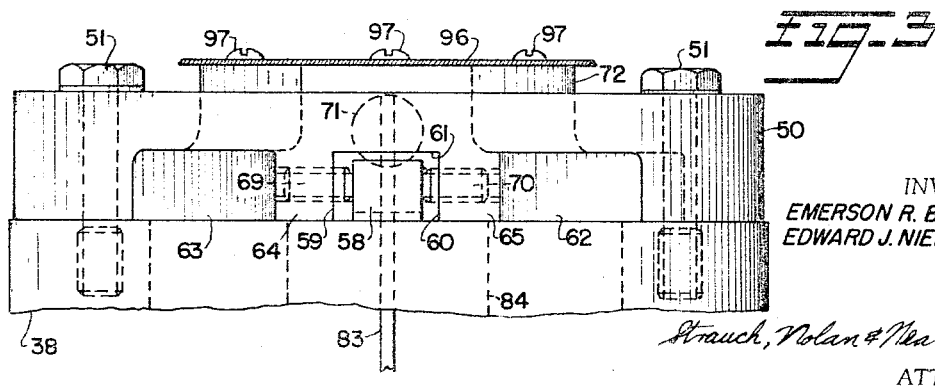

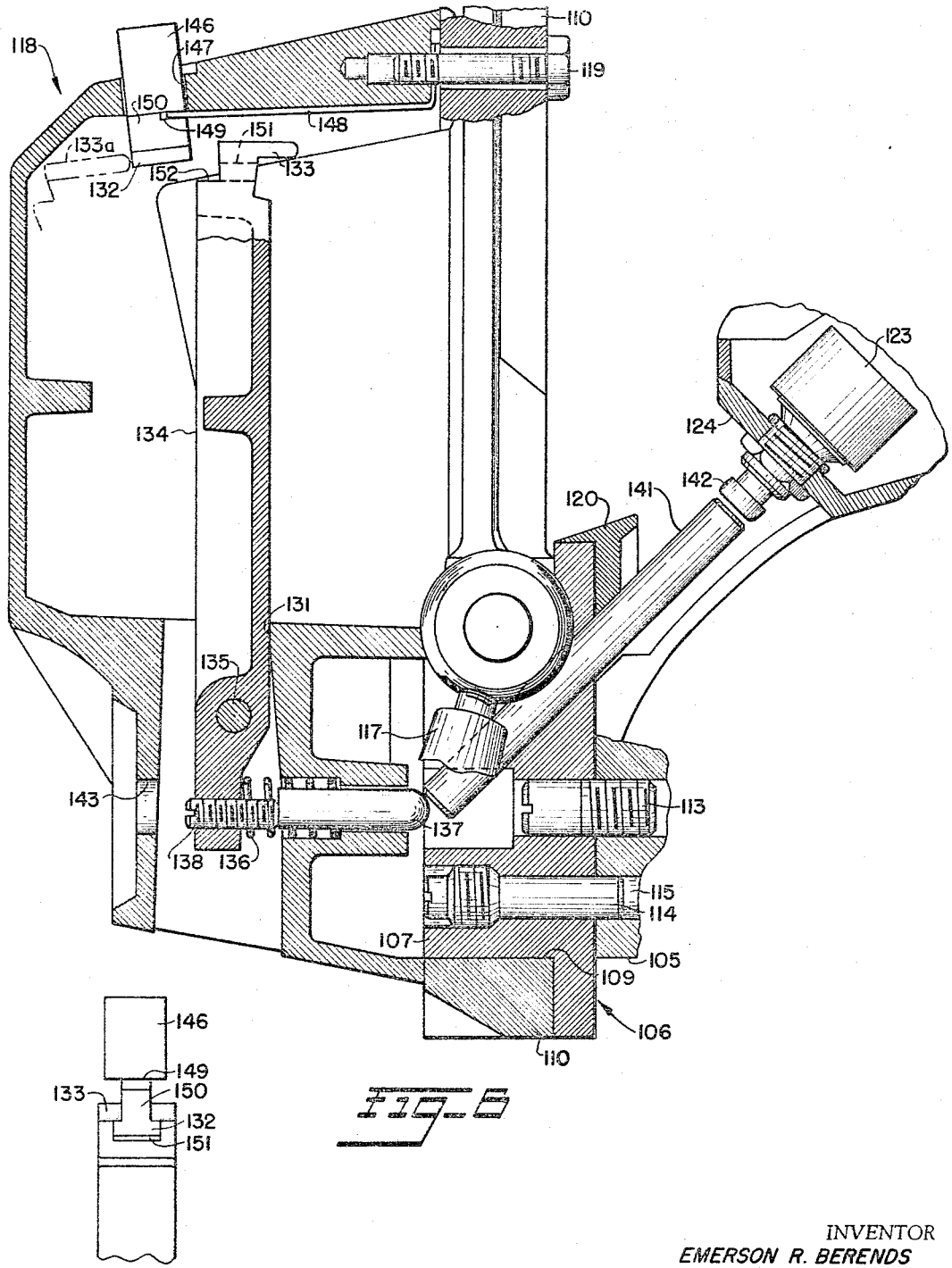

Filed Nov. 25, 1964   6 Sheets-Sheet 5

INVENTOR
EMERSON R. BERENDS
EDWARD J. NIEHAUS, JR.

BY Strauch, Nolan & Neale

ATTORNEYS

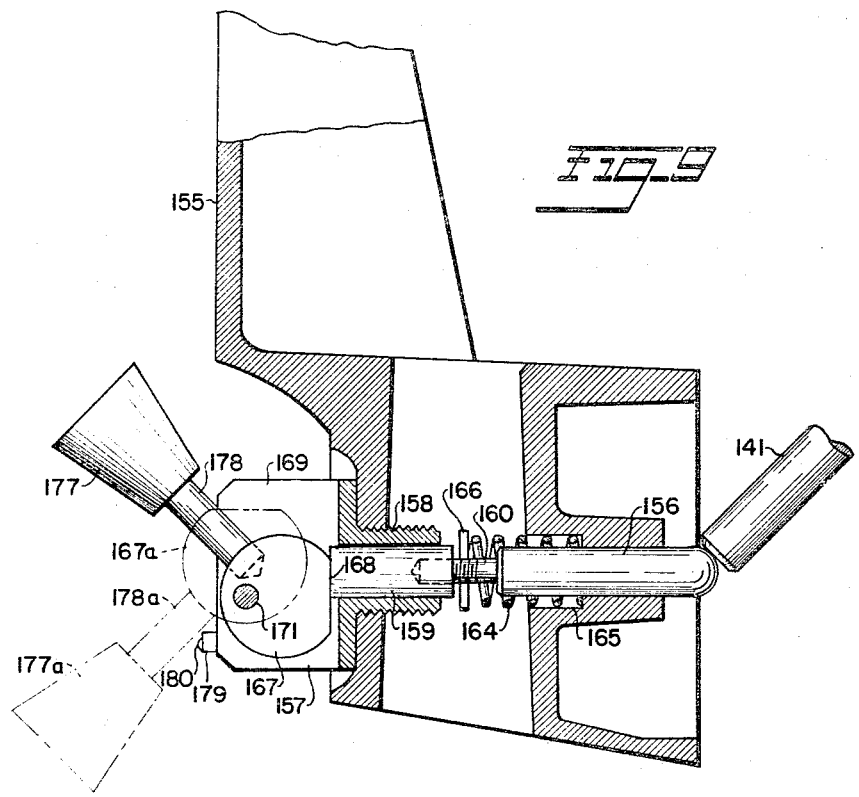
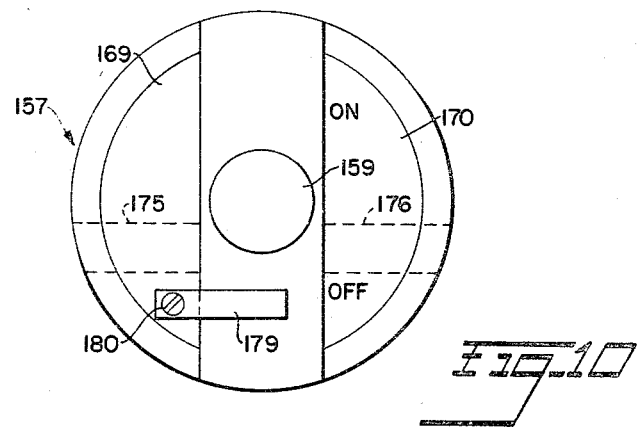

United States Patent Office 3,334,669
Patented Aug. 8, 1967

3,334,669
RADIAL ARM SAW
Emerson R. Berends, Tupelo, Miss., and Edward J. Niehaus, Jr., Pittsburgh, Pa., assignors to Rockwell Manufacturing Company, Pittsburgh, Pa., a corporation of Pennsylvania
Filed Nov. 25, 1964, Ser. No. 413,884
18 Claims. (Cl. 143—6)

This invention relates to improvements in cutting machines, particularly of the type in which a column extends vertically from a work table and carries a radial arm extending over the work table and rotatably supporting a horizontal turret arm. A yoke for an electric motor is slidably mounted in the turret arm for movement parallel to the surface of the table, and the motor carries a circular saw or other cutting tool. The yoke is also rotatable about a vertical axis so that the saw blade is parallel to the fence on the table when ripping wood, and the motor and cutter are also rotatable within the yoke for making beveled cuts.

It is advantageous and convenient for the operator to have the control for indexing the turret arm at the outer end of the turret arm and it is a principal object of the invention to provide a novel mechanism by which this is accomplished.

Another important object of the invention is the provision of a turret arm indexing mechanism wherein the principal components are within the turret arm and the turret arm journal shaft.

It is another important object of the invention to provide a novel control for the motor switch which is operable in any position of the motor and eliminates the need of wiring running to the control that is handled by the operator.

Other objects and advantages will become apparent as the description proceeds in connection with the accompanying drawings, wherein:

FIGURE 1A is an enlarged sectional view of a portion of FIGURE 1, along the line 1A—1A of FIGURE 1.

FIGURE 1B is an enlarged view of the connection between the right end of the index control rod which is within the turret arm and a vertical lever which extends upwardly within the hollow column on which the turret arm is rotatably journalled at the forward end of the radial arm.

FIGURE 3 is an enlarged view of the top portion of FIGURE 2, with the peripheral rim portion of the cover removed.

FIGURE 4 is a top plan view of FIGURE 3 but rotated 90 degrees, and with the entire cover removed.

FIGURE 5 is a vertical sectional view, taken along the line 5—5 of FIGURE 4.

FIGURE 6 is an enlarged view, partly in section of a portion of FIGURE 1, showing the motor switch control.

FIGURE 6A is a view of the grip switch handle and thumb operated trigger lock of FIGURE 6, as viewed from the right in FIGURE 6 and with the trigger lock depressed.

FIGURE 9 is an enlarged sectional view of another form of control for the motor switch.

FIGURE 10 is a view from the left of FIGURE 9, showing a portion of the control of FIGURE 9.

Figure 1:
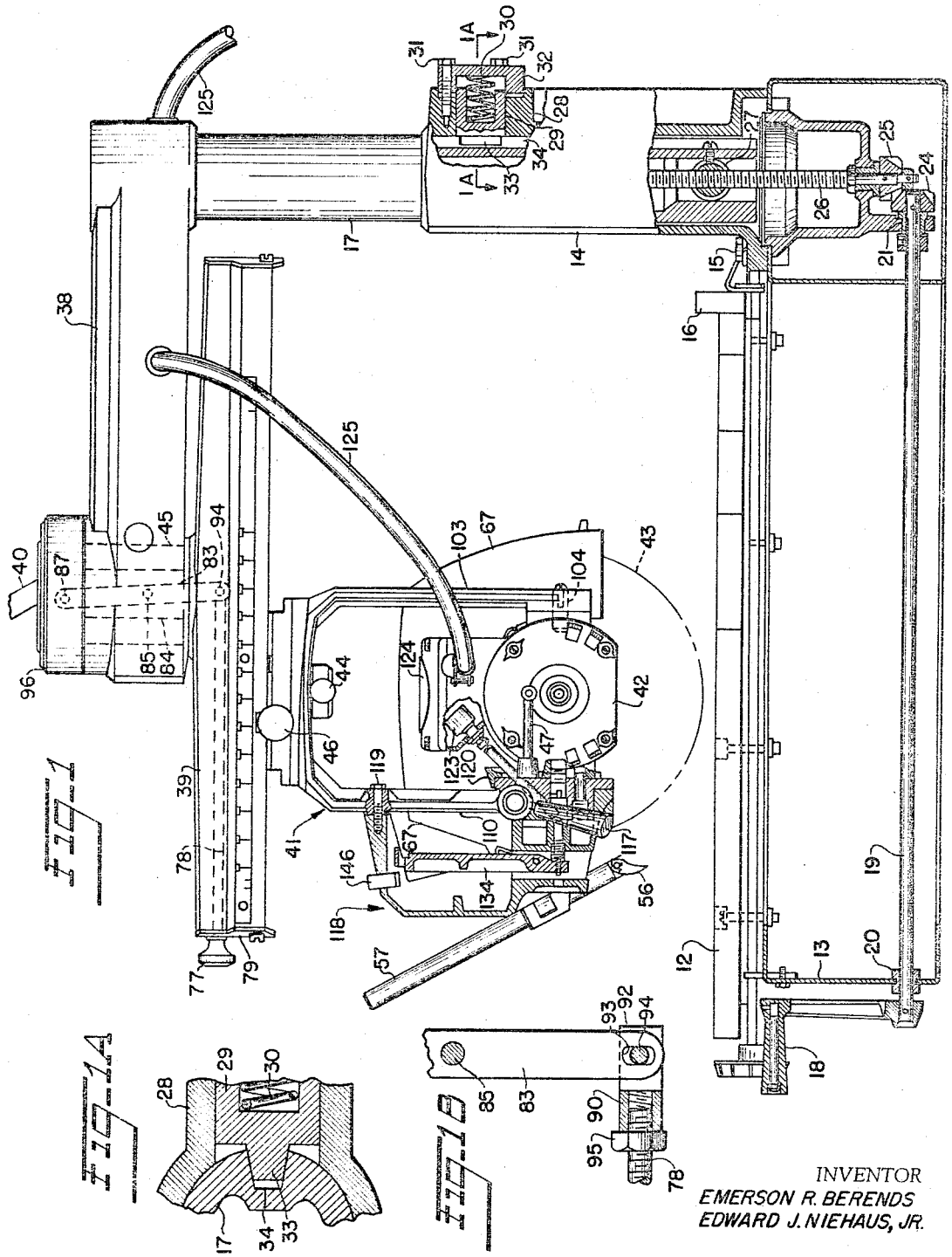
FIGURE 1 is a side elevation, partly in section, of a radial arm saw illustrating an embodiment of the invention.

Referring to FIGURE 1, a horizontal table 12 is mounted upon a frame 13 and has a rip fence 16 at the back. The rear of the frame supports a tubular column base 14 which is secured to the frame as by bolts 15 and journals a column 17 for vertical movement therein. The column is raised or lowered by turning a crank 18 on the front of the frame 13 mounted on a shaft 19 journalled for rotation at 20 and 21 in the frame 13. A bevel gear 24 on shaft 19 engages a similar gear 25 to rotate a vertical threaded shaft 26 which has threaded engagement with a nut 27 fixed in the column 17 whereby the column is raised or lowered.

Near its upper end the column base 14 includes a boss 28 having a bore therethrough which is radial with respect to the axis of column 17. Within this bore is a cylindrical piston 29 which is spring pressed to the left by a spring 30 which has one end seated in a central recess in the piston 29 and its other end against a cover 32. Three equiangularly spaced screws 31, only two of which appear in FIGURE 1 secure the cover. The force of the spring against piston 29 may be adjusted by turning the screws 31 to move the cover 32 closer to or further from its seat against the boss 28. The fullest compression of the spring 30 is when the cover abuts its seat in the boss 28.

At its left or inner end the piston 29 terminates in a tapered key portion 33 which fits in a mating tapered keyway 34 extending longitudinally in the column 17. As best seen in FIGURE 1A the key 33 does not bottom in the keyway 34 when fully seated. The key 33 and keyway 34 prevent rotation of the column 17 and their frictional engagement is adjustable by means of the screws 31 and cover 32.

Rigidly affixed to the top of the column 17 is a radial arm 38 which extends forward and perpendicular to the rip fence 16 to a point substantially over the mid-point of table 12. At the forward end of radial arm 38 a turret arm 39 is mounted in a well known fashion with a clamp type lock to allow rotation of the turret arm to a desired angle of cut when released and to clamp it in place after such rotation. The handle of the clamp is indicated at 40.

In addition there is provision for indexing the turret arm 39 when the aforesaid clamp type lock is released. The indexing means positively locates and indexes the turret arm at angles of zero degrees, 45 degrees left and 45 degrees right from the line of the radial arm 38. The reengagement of the clamp type lock secures the turret arm at its indexed position. A yoke 41 having depending legs carrying the drive motor 42 and the cutting tool, which in this case is a saw blade indicated in dot-dash lines at 43, is slidable within the turret arm 39 in conventional manner, whereby cross-cuts are made in the work piece, not shown, but normally resting on the surface of the table 12 and against the fence 16.

Ripping a workpiece is accomplished by rotating the yoke 41 through 90 degrees after loosening its clamp type lock, the handle of which is shown at 44. After resecuring this clamp type lock the yoke is shifted along the turret arm to position the saw blade 43 at the proper distance from the rip fence 16, the blade being parallel to the fence. Then the yoke 41 is secured by conventional means controlled by knob 46 against sliding movement along the turret arm 39, and the machine is ready for a ripping operation.

Figure 2:
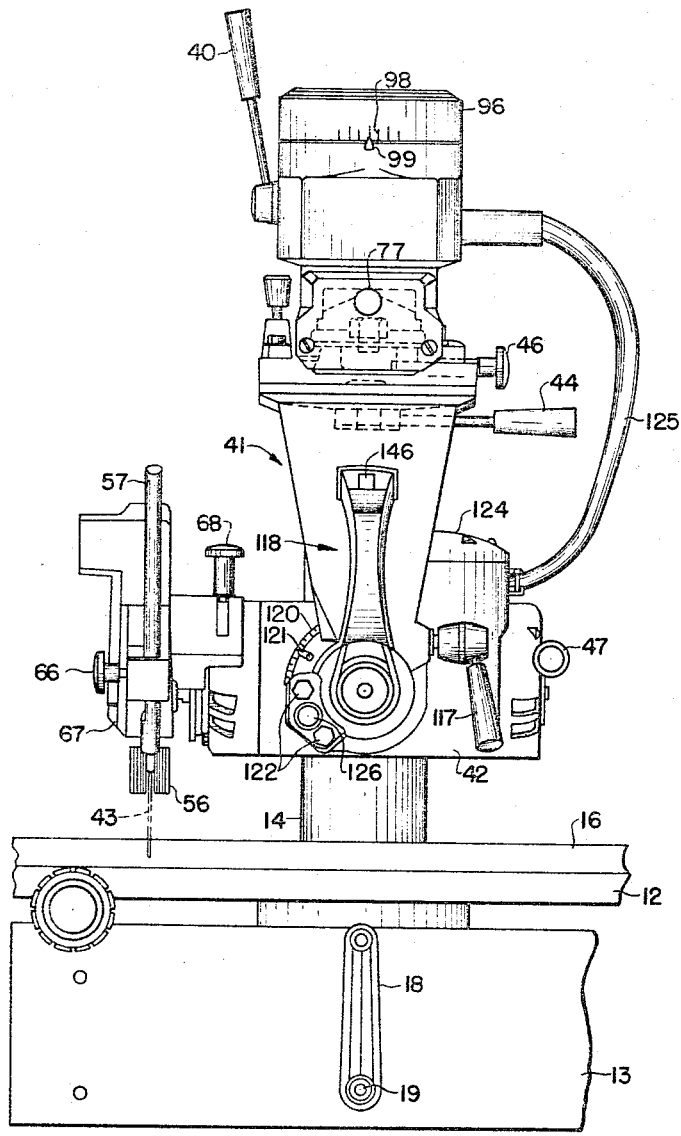
FIGURE 2 is a front elevation of the saw of FIGURE 1.

A brake for stopping the motor after the current has been cut off has an operating lever 47 shown in FIGURES 1 and 2. Anti-kick back fingers 56 are carried by a rod 57 which is axially slidably adjustable, being secured by a knob 66, and a blade guard housing 67, best shown in FIGURE 1 encloses a substantial portion of the cutting tool or saw blade 43. The housing 67 and rod 57 carried thereby are adjustable about the axis of the motor 42, being secured by the clamp handle 68 shown in FIGURE 2.

Except for the indexing mechanism to index the position of the turret arm 39 the previously described construction and adjustments are conventional in machines of this type, and the improved indexing mechanism will now be described.

Referring to FIGURE 5 there is shown the upper end portion of a hollow index column 45 by which the turret arm 39 is journalled for rotation in the forward end of the radial arm 38. The index column 45 fits within a vertical bore 48 within the radial arm 38 and has a peripheral flange 49 that rests upon a circular horizontal bearing surface on the top of the radial arm. The hollow index column 45 extends down through the radial arm 38 as shown by the dotted lines in FIGURE 1, and the turret arm 39 is fixedly secured to the bottom end of the index column by bolts, not shown.

An index stop ring 50 surrounds the index column 45 and is adjustably affixed to the top of the radial arm 38 by three bolts 51 which have reduced diameter shank portions 52 where they pass through the ring 50, thereby permitting a slight rotation of ring 50 when the three bolts are loosened. The index stop ring 50 has three indexing notches 53, 54 and 55 facing inwardly as shown in FIGURE 4. The notches 53 and 54 are spaced 45 degrees on either side of the central notch 55. There is a vertically upstanding lug 58 integral with or affixed to radial arm 38, which projects upwardly into a slot having opposed side walls 59 and 60 and top wall 61 (FIG. 3). On either side of the aforesaid slot are cavities 62 and 63 (FIGURES 3 and 4).

The two aforesaid cavities on either side of the slot thereby define a pair of spaced walls 64 and 65 on either side of the upstanding lug 58. A pair of set screws 69 and 70 threaded through these walls are used to properly position the index stop ring 50 so that the turret arm 39 is in exact parallel alignment with the radial arm 38 when an indexing pin 71, not yet described having an indexing nose 68 is seated within the central index notch 55. Once the index stop ring 50 is adjusted at the factory and secured in place by tightening the three bolts 51 it will normally remain in proper adjustment, but if accidental dislodgement occurs it can easily be reset by means of the set screws 69 and 70.

The index column 45 has a pair of coaxially aligned bosses 72 and 73 (FIG. 4) integral with the column but protruding upwardly beyond the plane of the peripheral flange 49 on the column. The boss 72 is bored to receive an indexing pin 71 which has its left end so shaped as to fit snugly into but not to bottom in the central index notch 55, as seen in FIGURE 4. The indexing pin is forcefully urged into the aforesaid notch, or the notches 53 and 54, by a compression spring 74 which is located by boss 73 and a bore 75 therein that is coaxial with indexing pin 71. The other end of spring 74 is seated in a bore 76 in the right end of the indexing pin 71 as viewed in FIGURE 5.

The indexing pin 71 is withdrawn from a notch in the index stop ring 50 by pulling on a knob 77 on the front end of the turret arm 39. The knob 77 is affixed to a protruding end of a pull rod 78 the forward end of which is journalled for sliding movement in the forward end wall 79 of the turret arm 39. The other end of pull rod 78 is hingedly connected to the bottom end of a lever 83 that passes vertically through a central bore 84 in the index column 45. The lever 83 is mounted upon a pivot pin 85 (FIGS. 1 and 1B) that is carried by the cylindrical wall of the index column 45. The upper end of lever 83 passes through a vertical slot 86 (FIG. 4) in the right or inner end portion of the indexing pin 71, to which it is secured by a pin 87 that has a tight fit in the index pin and passes through a vertically elongated slot 88 in the lever.

In order to change the position of the turret arm 39 from one indexed position to another the turret arm clamp is first released by means of handle 40. Now the knob 70 is pulled out, withdrawing the indexing pin from the notch 53, 54 or 55 within which it was engaged. Upon turning the turret arm 39 the knob 77 may be released, because the indexing pin 71 would now engage the circular inner wall 89 (FIG. 4) of the index stop ring 50. Upon reaching one of the other index notches the indexing pin will slip into it under the influence of spring 74, and the turret arm clamp may be tightened by means of the handle 40.

The hinged connection between the inner end of the pull rod 78 and the lower end of lever 83 includes an assembly by which adjustment may be made to provide assurance that the indexing pin 71 is fully withdrawn from an indexing notch when the knob 77 is pulled out. This is shown in FIGURE 1B. A member 90 which may be round or of any other cross section is bifurcated at its right end to provide a vertical slot, one wall of which is indicated by 92. A pin 94 secured in the walls of the slot passes through a vertical slot 93 in the bottom end of lever 83. The left end of member 90 is threaded to receive the threaded right end of pull rod 78. A jam nut 95 on the pull rod 78 is screwed tightly up against member 90 after the correct relative position of member 90 upon the end of the pull rod has been ascertained to assure full withdrawal of indexing pin 71 from an index notch. The slots 88 and 93 at the top and bottom of lever 83 are to prevent binding of the parts, since the movements of pull rod 78 and indexing pin 71 are rectilinear while the ends of lever 83 move in curvilinear paths.

An inverted cup shaped cover 96 encloses the indexing mechanism at the top of the index column 45. It is shown in full only in FIGURES 1 and 2, and a part is shown in FIGURE 3 to show how it is secured in place by screws 97 to the tops of the bosses 72 and 73. As appears in FIGURE 2 the bottom periphery of the cover 96 is provided with indicia 98 which cooperate with a pointer 99 affixed to the front of the radial arm 38 to indicate the angular position of the turret arm 39 with respect to the radial arm 38 and are used when the turret arm is turned to a position not indexed by the indexing pin 71 and one of the index notches. When in one of these positions the turret arm is secured in its selected position solely by the clamp type lock controlled by the handle 40. In such case the knob 77 on the pull rod 78 will remain in a pulled out position.

The drive motor 42 that carries the cutting tool 43 is mounted in the yoke 41 so as to be rotatable about a horizontal axis, in order to make beveled cuts on a workpiece. As viewed in FIGURE 1 the right hand yoke leg 103 carries a bearing 104 on which one side of the motor 42 is journalled. The other side of the motor has a boss 105 (FIG. 6) to which is affixed a motor trunnion mount 106 which is shown separately in FIGURES 7 and 8 for a better understanding thereof. The motor trunnion mount has a cylindrical bearing portion 107 and a flange 108. As best seen in FIG. 6 the bearing portion 107 is journalled in a bore 109 in the left hand trunnion mount leg 110. The motor trunnion mount 106 is aligned with the boss 105 on the motor by a central aligning stud 113 (FIG. 6), threaded into the boss and by an aligning screw 114 threaded into the trunnion mount and having an unthreaded portion protruding into a bore 115 in the motor boss 105. The trunnion mount 106 is fixedly secured to the motor boss by two screws, not shown in FIGURE 6, but which pass through the two holes 116 in the trunnion mount shown in FIGURE 7, the holes being counter-bored so that the heads of the screws are recessed. A conventional locking clamp is actuated by a clamp handle 117. A graduated scale 120 and a pointer 121 (FIGURE 2) cooperate to indicate the position of the axis of the shaft of the drive motor 42 with respect to the horizontal.

A handle or grip indicated generally at 118 is secured to the front face of the left trunnion mount leg 110 by a bolt 119 shown in FIGURE 6 and by two other bolts 122 shown in FIGURE 2. This grip is used for moving the yoke 41 along the turret arm 39 when making a cut in the work piece and also houses a control for a normally open motor switch 123 within a housing 124 on top of the motor 42. The switch 123 connects or disconnects the motor from the electric power supplied by a flexible electric cable 125. The handle or grip also journals for axial movement a spring pressed plunger, not shown except for its handle 126 in FIGURE 2. This plunger is selectively engaged in holes 127, 128 or 129 (FIGURE 7) in the flange 108 of the motor trunnion mount 106 for indexing the motor 42 in any one of three positions when the locking clamp controlled by handle 117 is loosened. The three holes are 45 degrees apart and when the saw blade is vertical as in FIGURE 2 the aforesaid plunger is engaged in the middle hole 128.

Referring to FIGURE 6, there is mounted within the handle 118 a grip switch handle or lever 134 which is pivoted on a pin 135 and urged clockwise by a coiled spring 136 seated in a bored recess in the handle 118 in alignment with an axially movable pin 137 having a rounded or bullet shaped nose at its right end. The left end of pin 137 is engaged by a set screw 138 threaded through the lower end of lever 134.

Figure 7:
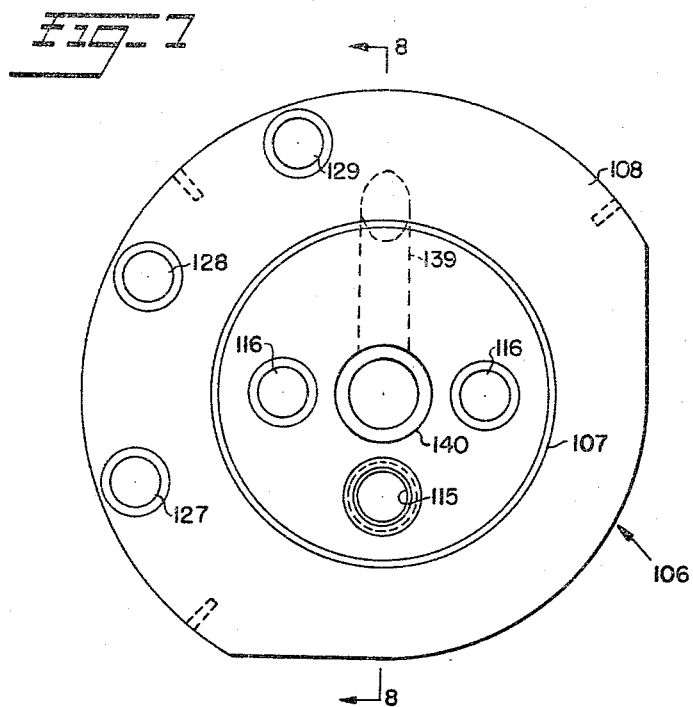
FIGURE 7 is a front view of a motor trunnion mount shown in section in FIGURE 6.
Figure 8:
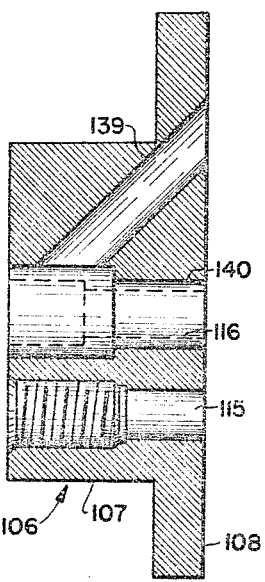
FIGURE 8 is a view in section along the line 8—8 of FIGURE 7.

FIGURES 7 and 8 show an angular bore 139 which intersects the axial bore for the central aligning stud 113. As shown in FIGURE 6 a sliding plunger 141 is received in this bore, in alignment with the push button 142 on the switch 123, and with its lower end resting against the rounded nose of the pin 137, which pin is coaxial with the axis about which the motor 42 is turned to make bevel cuts.

The motor is energized by pulling the handle 134 counterclockwise with the fingers, against the resistance of spring 136. This presses the set screw 138 against pin 137 which in turn pushes the plunger 141 against the button 142 of the motor switch 123 to close the switch and energize the motor. When the lever 134 is released the spring 136 pushes the lever back to its zero or off position and the set screw 138 is disengaged from the pin 137. The spring within the normally open switch 123 is sufficiently strong for the push button 142 to return the plunger 141 and pin 137 to their original or switch-off positions. The set screw 138 is accessible through an opening 143 in the front of the handle or grip 118 to provide the timely operation of pin 137 with the counterclockwise rotation of the grip switch handle or lever 134.

A thumb operated trigger lock 146 shown in FIGURES 6 and 6A is mounted in the top of the grip 118 for the purpose of controlling the movements of the grip switch handle or lever 134. The trigger lock 146 is rectangular in horizontal cross section and is slidable in a mating opening 147 through the top of the handle 118. A flat spring 148 is secured by handle bolt 119 and has its left or free end engaged in a slot 149 in the right face of the lock 146 to bias the lock to its uppermost position as shown in FIGURE 6. As shown in FIGURE 6 when the lock is in its upper position it lies in the path of movement of the upper end of grip lever 134 and prevents its counterclockwise rotation to close the switch 123, thus preventing inadvertent actuation of the motor. Below the slot 149 the lock 146 is in the form of an inverted T-shaped element 150 as seen in FIGURE 6A. The top end of lever 134 has a corresponding inverted T-shaped slot 151 within which the element 150 slides freely when the lock 146 is depressed.

In operation the lever 134 is pulled counterclockwise by the fingers until its upper end 133 engages the bottom 132 of lock 146 lightly. Then lock 146 is depressed by the thumb until its bottom end 132 strikes a shoulder 152 on the upper end portion of the lever 134. This places bottom end 132 on the lock 146 in line with its mating slot 151 in the lever 134, and lever 134 can then be pulled further counterclockwise by the fingers until the motor starts. Lever 134 may be held in this position by the fingers or it may be pulled further counterclockwise to lock it in the "motor on" position. This occurs when the lever 134 has been pulled far enough so that its upper end 133 is at the position shown at 133A in FIGURE 6 so that the bottom end 132 on lock 146 becomes disengaged from the mating slot 151 in lever 134, whereupon the lock 146 will snap to its upper position, because of the bias of spring 148, where it now blocks movement of the lever 134 under the bias of the spring 136 which is bearing against the lower end 132 of the trigger lock 146. With the switch 123 now locked in the ON position the operator may give his full attention to the manual operation of the yoke 41 along the turrent arm 39 for cross cuts, or to the manual operation of the workpiece for ripping, as the case may be.

After the cutting operation is completed the motor is turned off by depressing the thumb operated trigger lock 146. When the bottom end 132 on the lock 146 becomes aligned with its mating slot 151 on the lever 134 the lever will snap to the right, in a clockwise direction, under the influence of the spring 136 bearing against its lower end, and the switch 123 will open. Clockwise movement of the grip switch handle 134 is limited by its engagement with an abutment 131 above the pin 135 as shown in FIGURE 6.

Thus the construction permits the clamp handle 118 and the grip switch lever 134 to remain vertical irrespective of the angular position of the motor and blade 43 in the trunnion mount 41 yet the movement of the lever 134 is transmitted to the sliding plunger to actuate the switch 123 because of the location of the movable pin 137 in axial alignment with the axis of movement of the motor within the trunnion mount 41.

FIGURES 9 and 10 illustrate another embodiment of control for the switch 123. A handle or grip 155 similar in all respects to the handle or grip 118 of FIGURE 6 and secured to the yoke leg 110 in the same manner has an axially movable pin 156 operable to move the sliding plunger 141 in the same manner. Instead of the grip switch lever of FIGURE 6 a cam type control is used.

A cam bracket 157 has threads 158 by which it is secured in a threaded opening through the front wall of the grip 155 in axial alignment with the pin 156. Slidably mounted in bracket 157 is a plunger 159 coaxial with the pin 156 with which it is adjustably connected, there being a reduced threaded portion 160 on pin 156 that is engaged in correspondingly threaded bore in the plunger 159. A compression spring 164 is seated in a counter-bore 165 surrounding the pin 156 and its left end bears against a pin 166 fixedly secured in a hole through the reduced threaded portion 160 of pin 156. The spring urges the assembled pin 156 and plunger 159 to the left, the end of the threaded portion 58 of the bracket 157 serving as a stop when pin 166 engages it.

A cam 167 which is circular in profile except for a flat 168 as shown in FIGURE 9 is rotatably mounted between the spaced legs 169 and 170 of the bracket 157 by a pin 171 passing through aligned bores 175 and 176 (FIGURE 10). In FIGURE 10 the cam 167 and the pin 171 have been removed. The axis of the pin 171 is not through the center of the cam, but considerably spaced therefrom as shown in FIGURE 9 and opposite to the midpoint of the flat 168 on the cam. The axis of pin 171 is also slightly below the axis of the pin-plunger assembly 156, 159. A handle 177 for rotating the cam 167 has its shank 178 threaded into the circular edge of the cam.

When the handle is in the raised position shown in solid lines in FIGURE 9 the switch control is in the ON position, with the flat 168 against the plunger 159 and the sliding plunger is in its uppermost position, closing the switch 123, not shown in FIGURE 9. With the flat 168 on the cam engaging the flat end of plunger 159 the spring 166 holds the cam 167 in the ON position. To open the motor switch 123 the handle 177 is turned downward through 90 degrees until its shank 178 engages a stop 179 secured to the face of bracket leg 169 by a screw 180, or if no stop is used the handle 177 will hang substantially vertically downward. The cam and handle will then be in the dot-dash positions indicated at 167a and 177a in FIGURE 9 and the spring 164 will have moved the plunger 159 and pin 156 assembly to the left until the pin 166 engages the end of threaded element 158 as previously described.

The switch control of FIGURES 9 and 10 provides a simpler construction than that of FIGURE 6 but while it does provide means for retaining the switch 123 in closed position it does not provide a lock to prevent inadvertent closing of the switch and energization of the drive motor 42 as does the thumb operated trigger lock 146 of FIGURE 6. Both embodiments are operative irrespective of the position of the motor and saw blade in the yoke 41.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A radial arm power tool comprising,
   (a) a horizontal table,
   (b) a vertical column extending upwardly beyond said table,
   (c) a radial arm mounted on said column, extending over said table and terminating in a forward end,
   (d) a tubular index column mounted in the forward end of said radial arm for rotation about a vertical axis,
   (e) a turret arm below said radial arm, affixed to said tubular index column for rotation therewith in a horizontal plane over said table and having forward and rear ends on opposite sides of said index column,
   (f) a cutting tool mount carried by said turret arm and mounted therein for sliding movement in a horizontal direction,
   (g) a turret arm indexing mechanism carried by said index column and said radial arm and operative to lock said turret arm and index column in any of several indexed positions,
   (h) control means for said indexing mechanism mounted adjacent the forward end of said turret arm,
   (i) and linkage means extending from said control means through said turret arm and upwardly through said tubular index column and connected to said indexing mechanism.

2. The device of claim 1 wherein said indexing mechanism comprises,
   (a) a first indexing element carried by said index column,
   (b) a second indexing element carried by said radial arm,
   (c) and a spring urging one of said indexing elements into engagement with the other,
   (d) said control and linkage means being operable to overcome said spring and disengage said indexing elements to permit rotation of said index column and turret arm with respect to said radial arm.

3. The device of claim 1 wherein said indexing mechanism comprises,
   (a) an indexing pin carried by said index column and slidably movable diametrically thereof,
   (b) and an indexing ring affixed to said radial arm and having notches therein for selective engagement by said indexing pin.

4. The device of claim 1 wherein said indexing mechanism comprises,
   (a) an indexing pin carried by said index column and slidably movable diametrically thereof,
   (b) and an indexing ring affixed to said radial arm and having notches therein for selective engagement by said indexing pin,
   (c) and means for adjusting the position of said indexing ring with respect to said index column, comprising,
   (d) a pair of set screws carried by said ring,
   (e) fixed means on said radial arm between said set screws for engagement by said set screws,
   (f) and means for clamping said ring to said radial arm when in adjusted position.

5. In the radial arm power tool of claim 1,
   (a) said linkage means including a lever extending vertically through said tubular index column,
   (b) and a pivot in said column upon which said lever is pivoted on a horizontal axis,
   (c) said lever being connected at its upper end to said indexing mechanism and at its lower end to said control means.

6. In the radial arm power tool of claim 1,
   (a) said linkage means including a lever extending vertically through said tubular index column,
   (b) a pivot in said column upon which said lever is pivoted on a horizontal axis,
   (c) a first connection between the upper end of said lever and said indexing mechanism,
   (d) and a second connection between the lower end of said lever and said control means,
   (e) said second connection including an adjustment to vary its length.

7. In an electric motor driven power tool,
   (a) a horizontal turret arm,
   (b) a yoke carried by said turret arm and mounted for horizontal sliding movement thereon,
   (c) an electric motor supported in said yoke and including a rotatable mount for positioning said motor about an axis transverse to that of the motor shaft,
   (d) a switch in the motor circuit and mounted on said motor for movement therewith,
   (e) an axially movable pin mounted on said yoke coaxial with the axis about which said motor is positioned within said yoke,
   (f) and means movable with said switch and motor about the same axis about which said motor is positioned and connecting said axially movable pin and said switch to translate a movement of said pin to said switch to close said switch irrespective of the position of the motor within said yoke.

8. In an electric motor driven power tool,
   (a) a horizontal turret arm,
   (b) a yoke carried by said turret and mounted for horizontal sliding movement thereon,
   (c) an electric motor for driving a power tool,
   (d) a trunnion mounted in said yoke for rotation about a horizontal axis,
   (e) said motor being mounted on said trunnion for rotation therewith with respect to said yoke,
   (f) a motor switch in the motor circuit and mounted on said motor for movement therewith,
   (g) an axially movable pin mounted on said yoke coaxially with the axis of rotation of said trunnion, (h) and translating means between said pin and said switch to translate a movement of said pin to said switch to close said switch irrespective of the position of the motor within said yoke.

9. In the device of claim 8,
(a) a grip on said yoke for moving said yoke along said turret arm,
(b) said grip having a portion thereof adjoining said trunnion,
(c) said axially movable pin being mounted in said grip,
(d) a grip switch handle pivotally mounted on said grip and operable when moved in one direction to move said pin to close said motor switch,
(e) and means to move said grip switch handle in the other direction to release said pin to open said motor switch.

10. In the device of claim 9,
(a) said last mentioned means comprising a spring,
(b) and said grip switch handle having a set screw therein for engagement with said pin to move said pin in one direction to close said switch,
(c) said set screw being adjustably positionable to effect timely movement of said pin upon movement of said grip switch handle.

11. In the device of claim 8, said translating means comprising a sliding plunger passing through said trunnion,
(a) one end of said sliding plunger being engageable with said axially movable pin and the other end being engageable with said motor switch.

12. In the device of claim 8, said motor switch being mounted on said motor at a point not on the axis of said axially movable pin,
(a) said translating means comprising a sliding plunger passing through said trunnion at an angle to the axis of said axially movable pin,
(b) said motor switch, sliding plunger and axially movable pin all lying in the same plane,
(c) one end of said sliding plunger being engageable with said axially movable pin and the other end being engagable with said motor switch.

13. In the device of claim 9,
(a) a lock in said grip having a blocking portion preventing the movement of said grip switch handle when in normal raised position,
(b) means biasing said lock toward said raised blocking position,
(c) and passage means on said grip switch handle permitting movement of said grip switch handle past said blocking portion when aligned with said blocking portion of said lock.

14. In the device of claim 13,
(a) means on said grip switch handle preventing movement of said blocking portion on said lock beyond the position where it is aligned with said passage means on said grip switch handle.

15. In an electric motor driven device,
(a) a yoke for supporting a motor,
(b) a trunnion mounted in said yoke for rotation about an axis passing through the legs of said yoke,
(c) an electric motor mounted on said trunnion for rotation therewith with respect to said yoke,
(d) an axially movable pin mounted on said yoke coaxially with the axis of rotation of said trunnion,
(e) a motor switch in the motor circuit and mounted on said motor for movement therewith,
(f) a sliding plunger passing through said trunnion at an angle to the axis of said axially movable pin,
(g) said axially movable pin, motor switch and plunger all lying in the same plane,
(h) one end of said sliding plunger being engageable with said axially movable pin and the other end being engageable with said motor switch.

16. In the device of claim 15,
(a) an element mounted on said yoke for moving said axially movable pin in a direction to close said motor switch,
(b) a spring operable to bias said element in the opposite direction,
(c) and a hand operated rotatable handle mounted on said yoke and operable to move said element and axially movable pin in a direction to close said motor switch.

17. In the device of claim 16,
(a) said rotatable handle including a cam engageable with said element to move it and having a flat surface which engages said element when the motor switch is closed,
(b) said spring being operative to press said element against said flat surface to hold said rotatable handle in switch closed position.

18. A radial arm power tool comprising,
(a) a horizontal table,
(b) a fixed tubular column base extending upwardly beyond said table,
(c) a vertical cylindrical column mounted in said column base for vertical sliding movement therein, and extending upwardly beyond said base,
(d) a vertical keyway in said vertical column,
(e) a spring pressed key in said column base and engaged in said keyway,
(f) means for raising and lowering said vertical column,
(g) a radial arm fixedly mounted on said column, extending over said table and terminating in a forward end,
(h) a tubular index column mounted in the forward end of said radial arm for rotation about a vertical axis,
(i) a turret arm below said radial arm, affixed to said tubular index column for rotation therewith in a horizontal plane over said table and having forward and rear ends on opposite sides of said index column,
(j) a yoke for carrying a motor driven cutting tool carried by said turret arm and mounted therein for sliding movement in a horizontal direction and for rotation about a vertical axis,
(k) a turret arm indexing mechanism carried by said index column and said radial arm and operative to lock said turret arm and index column in any of several indexed positions,
(l) control means for said indexing mechanism mounted adjacent the forward end of said turret arm,
(m) linkage means extending from said control means through said turret arm and upwardly through said tubular index column and connected to said indexing mechanism,
(n) a trunnion mounted in said yoke for rotation about a horizontal axis,
(o) an electric motor for driving a power tool mounted on said trunnion for rotation therewith in respect to said yoke,
(p) a motor switch in the motor circuit and mounted on said motor for movement therewith,
(q) an axially movable pin mounted on said yoke coaxially with the axis of rotation of said trunnion,
(r) translating means between said pin and said switch to translate a movement of said pin to said switch to close said switch irrespective of the position of the motor within said yoke,
(s) a grip affixed to the leg of said yoke in which said trunnion is journalled,
(t) and a handle pivotally mounted in said grip and operable to move said axially movable pin in a direction to close said switch.

(References on following page)

References Cited

UNITED STATES PATENTS

| | | |
|---|---|---|
| 2,590,093 | 4/1952 | Duerr. |
| 2,590,119 | 4/1952 | Osterhus. |
| 2,773,524 | 12/1956 | Schultz et al. |
| 3,021,879 | 2/1962 | Berends et al. |

WILLIAM W. DYER, JR., *Primary Examiner.*

WAYMOND D. BRAY, *Assistant Examiner.*